United States Patent
Higashide et al.

(10) Patent No.: US 12,230,135 B2
(45) Date of Patent: Feb. 18, 2025

(54) CONTROL METHOD, SERVER, AND SYSTEM

(71) Applicant: TOYOTA JIDOSHA KABUSHIKI KAISHA, Toyota (JP)

(72) Inventors: Hiroshi Higashide, Nagoya (JP); Keiichi Uno, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 537 days.

(21) Appl. No.: 17/512,000

(22) Filed: Oct. 27, 2021

(65) Prior Publication Data

US 2022/0130245 A1    Apr. 28, 2022

(30) Foreign Application Priority Data

Oct. 27, 2020   (JP) .................. 2020-179984

(51) Int. Cl.
   *G08G 1/127*   (2006.01)
   *B60K 31/00*   (2006.01)

(52) U.S. Cl.
   CPC ......... *G08G 1/127* (2013.01); *B60K 31/0008* (2013.01)

(58) Field of Classification Search
   None
   See application file for complete search history.

(56) References Cited

U.S. PATENT DOCUMENTS

| | | | |
|---|---|---|---|
| 2013/0144467 A1* | 6/2013 | Kickbusch | G06Q 10/0631 701/2 |
| 2019/0315345 A1* | 10/2019 | Newman | B60W 50/14 |
| 2020/0285245 A1* | 9/2020 | Noguchi | G08G 1/149 |

FOREIGN PATENT DOCUMENTS

JP    2020-013379 A    1/2020

* cited by examiner

*Primary Examiner* — Todd Melton
*Assistant Examiner* — Jason R Roberson
(74) *Attorney, Agent, or Firm* — Oliff PLC

(57) ABSTRACT

A control method for controlling a plurality of vehicles automatically traveling to follow an operation schedule includes judging, by a server, whether a first vehicle is delayed relative to the operation schedule, judging, by the server, whether passing of the first vehicle by a second vehicle has occurred when the first vehicle is judged to be delayed relative to the operation schedule, and setting, by the server, a limit on a vehicle speed of the first vehicle when the passing is judged to have occurred.

18 Claims, 5 Drawing Sheets

CONTROL METHOD, SERVER, AND SYSTEM

CROSS-REFERENCE TO RELATED APPLICATION

This application claims priority to Japanese Patent Application No. 2020-179984, filed on Oct. 27, 2020, the entire contents of which are incorporated herein by reference.

TECHNICAL FIELD

The present disclosure relates to a control method, a server, and a system.

BACKGROUND

Technology for controlling a plurality of vehicles that travel automatically is known. For example, patent literature (PTL) 1 discloses an electric vehicle that drives automatically in accordance with an operation schedule.

CITATION LIST

Patent Literature

PTL 1: JP 2020-013379 A

SUMMARY

There is room for improvement in technology for controlling a plurality of vehicles that travel automatically.

It would be helpful to improve technology for controlling a plurality of vehicles that travel automatically.

A control method according to an embodiment of the present disclosure is a control method for controlling a plurality of vehicles automatically traveling to follow an operation schedule, the control method including:
  judging, by a server, whether a first vehicle is delayed relative to the operation schedule;
  judging, by the server, whether passing of the first vehicle by a second vehicle has occurred when the first vehicle is judged to be delayed relative to the operation schedule; and
  setting, by the server, a limit on a vehicle speed of the first vehicle when the passing is judged to have occurred.

A server according to an embodiment of the present disclosure is a server including a communication interface configured to communicate with a plurality of vehicles automatically traveling to follow an operation schedule and a controller configured to:
  judge whether a first vehicle is delayed relative to the operation schedule;
  judge whether passing of the first vehicle by a second vehicle has occurred when the first vehicle is judged to be delayed relative to the operation schedule; and
  set a limit on a vehicle speed of the first vehicle when the passing is judged to have occurred.

A system according to an embodiment of the present disclosure is a system including a plurality of vehicles automatically traveling to follow an operation schedule and a server configured to communicate with the plurality of vehicles, wherein the server is configured to:
  judge whether a first vehicle is delayed relative to the operation schedule;
  judge whether passing of the first vehicle by a second vehicle has occurred when the first vehicle is judged to be delayed relative to the operation schedule; and
  set a limit on a vehicle speed of the first vehicle when the passing is judged to have occurred.

According to embodiments of the present disclosure, technology for controlling a plurality of vehicles that travel automatically is improved.

DETAILED DESCRIPTION

Hereinafter, an embodiment of the present disclosure will be described.

Summary of Embodiment

Figure 1:
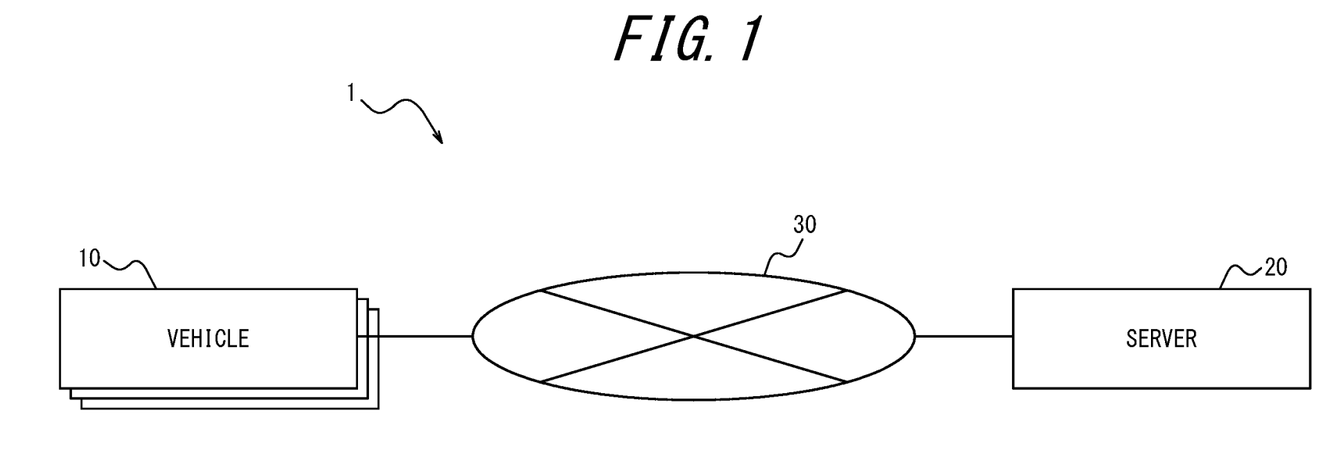
FIG. 1 is a block diagram illustrating a schematic configuration of a system according to an embodiment of the present disclosure.

An outline of a system 1 according to an embodiment of the present disclosure will be described with reference to FIG. 1. The system 1 includes a plurality of vehicles 10 and a server 20. The plurality of vehicles 10 and the server 20 can communicate with each other via a network 30 including, for example, the Internet and a mobile communication network. The vehicle 10 is, for example, a passenger automobile such as a bus, but the vehicle 10 is not limited to this and may be any vehicle that a person can board. The vehicle 10 is capable of automatically performing steering and acceleration/deceleration operations in an environment that meets certain criteria, for example, or in any environment. The vehicle 10 may be capable of automated driving such as any one of Level 1 to Level 5 as defined by the Society of Automotive Engineers (SAE), for example. The server 20 is, for example, an information processing apparatus such as a computer.

In the present embodiment, the plurality of vehicles 10 are used as circulating buses that travel over a circulation route. The server 20 manages the operation of the plurality of vehicles 10 by notifying the plurality of vehicles 10 of an operation schedule. The plurality of vehicles 10 operate in accordance with the operation schedule notified by the server 20.

Figure 2:
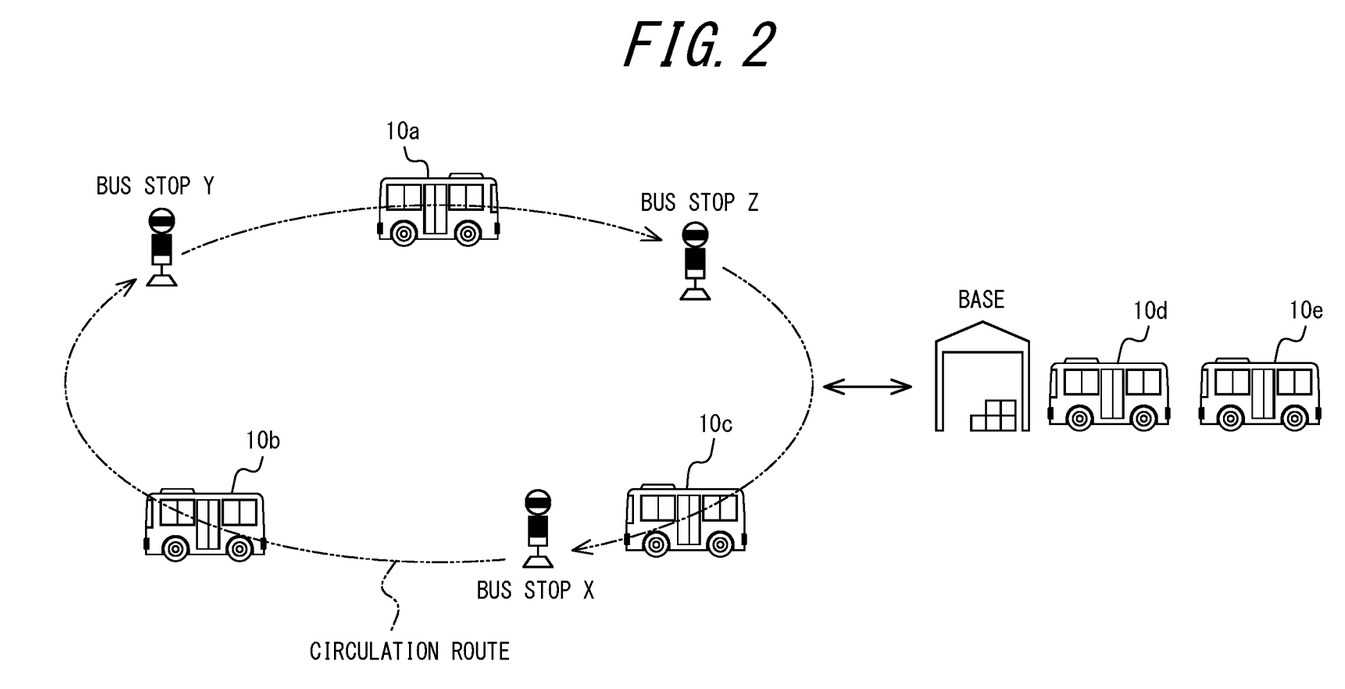
FIG. 2 is a diagram illustrating an overview of a transportation service according to an embodiment of the present disclosure.

With reference to FIG. 2, an overview of operations of each vehicle 10 that operates in accordance with the operation schedule will be described. When introduced into the circulation route from a base, each vehicle 10 can travel clockwise along the circulation route while allowing passengers to get on and off at each bus stop among bus stops X to Z on the circulation route. In FIG. 2, three vehicles 10a to 10c are traveling on the circulation route. When each vehicle 10 has traveled a specified number of laps n (n is a natural number equal to or greater than 2, and n=4 laps in the present embodiment) after being introduced into the circulation route, the vehicle 10 returns to the base and switches with another vehicle 10 on standby. Here, "switches" indicates that the vehicle 10 returns to the base from the circulation route and that the other vehicle 10 on standby is introduced into the circulation route from the base. The switching of a vehicle 10 with another vehicle 10 on standby is also referred to below as "normal switching". In FIG. 2, two vehicles 10d, 10e are on standby at the base. Each vehicle 10 returns to the base from the circulation route and remains on standby at the base after undergoing operations such as refueling and maintenance, for example.

Figure 3:
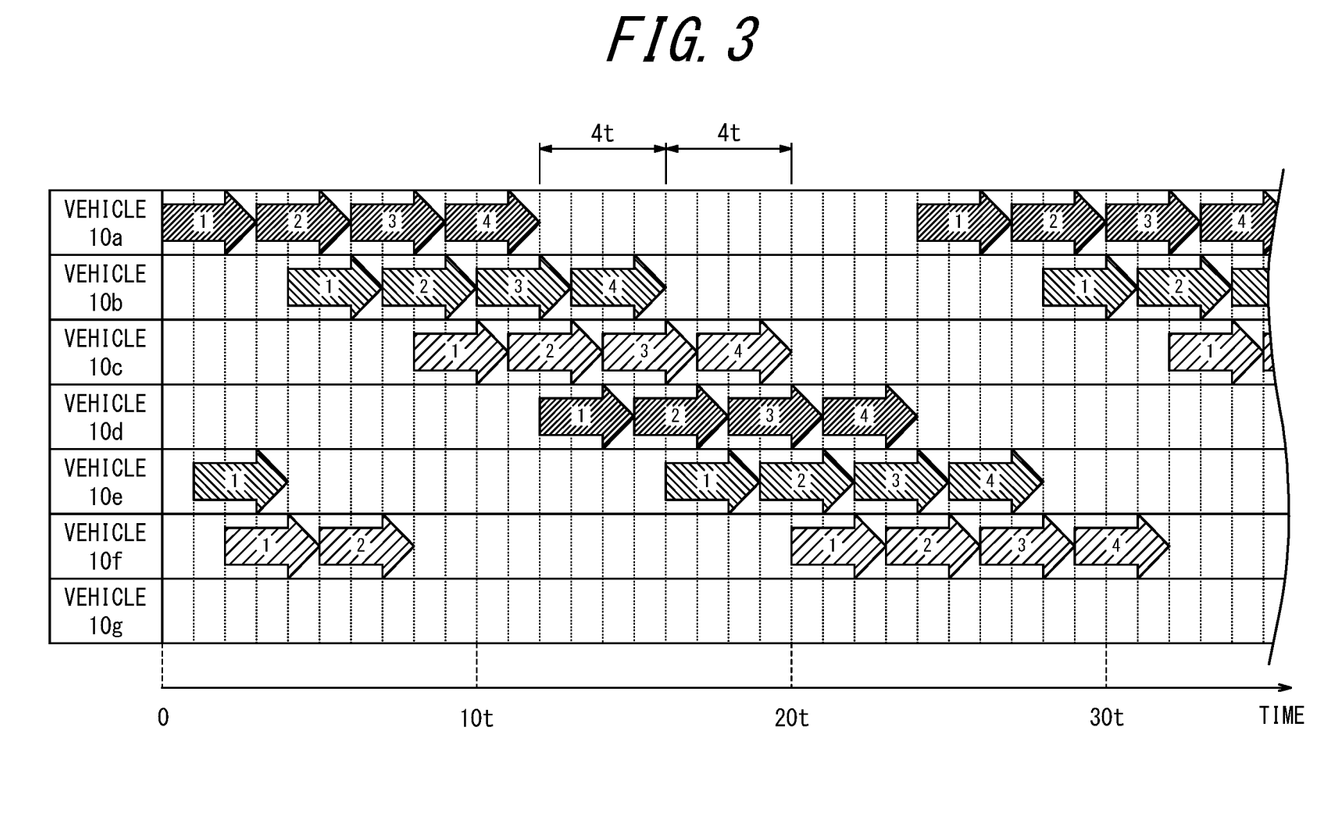
FIG. 3 is a diagram illustrating an example of an operation schedule.

With reference to FIG. 3, the operation schedule will be explained in detail. FIG. 3 illustrates the operation schedule assigned to each of seven vehicles 10a to 10g. The horizontal axis in FIG. 3 indicates the time. Time=0 is an operation start time of the transportation service using the plurality of vehicles 10. The time periods depicted with a rightward arrow indicate that the vehicle 10 is traveling on the circulation route. The length of the arrow indicates the time (3t in the present embodiment) required for the vehicle 10 to travel one lap on the circulation route. The numerical value inside the arrow indicates the number of the lap that the vehicle 10 is on after introduction into the circulation route. The time corresponding to the left end of the arrow with the number "1" inside indicates the time when the vehicle 10 is introduced into the circulation route from the base. The time corresponding to the right end of an arrow indicates the time at which the vehicle 10 returns to the base from the circulation route if there is no continuous next arrow to the right of the arrow.

When the operation schedule illustrated in FIG. 3 is applied, the vehicle 10a is introduced into the circulation route from the base at time=0, and when the vehicle 10a completes the specified number of laps n (here, n=4 laps) at time=12t, the vehicle 10a returns to the base and is switched with the vehicle 10d on standby, for example. The vehicle 10d is introduced into the circulation route from the base at time=12t, returns to the base at time=24t after completing the specified number of laps n (here, n=4 laps), and is switched with the vehicle 10a on standby. In this way, the vehicles 10a and 10g operate while switching with each other. Similarly, the vehicles 10b and 10e operate while switching with each other, and the vehicles 10c and 10f operate while switching with each other. Here, the vehicle 10b is introduced into the circulation route at time=4t, and the vehicle 10c is introduced into the circulation route at time=8t.

Consequently, according to the operation schedule, the number of vehicles 10 traveling on the circulation route is maintained at the specified number (in this case, a=3) from time=8t onwards. From time=8t onwards, "a" vehicles 10 traveling on the circulation route are arranged at substantially equal intervals on the circulation route. The above-described normal switching also occurs once in a specified period P (here, P=4t) from time=12t onwards. Also, from time=8t onwards, a plurality of vehicles 10 are not on the same lap simultaneously among the "a" vehicles 10 traveling on the circulation route (i.e., the number of the lap being traveled differs for each of the "a" vehicles 10 traveling on the circulation route). For example, vehicles 10a, 10b, and 10c, which are traveling on the circulation route at time=8t, are traveling on their third, second, and first laps, respectively. Since a plurality of vehicles 10 are not on the same lap simultaneously, the specified period P can be longer than the time required for the vehicle 10 to make one lap of the circulation route (in this case, 3t). By lengthening the specified period P in which the normal switching occurs, the frequency with which the vehicles 10 return to the base from the circulation route (for example, the frequency with which regular switching occurs) is reduced, thereby increasing the time available for operations such as refueling and maintenance to be performed on the vehicles 10 that return to the base.

As an exception, the vehicle 10e is introduced into the circulation route at time=t and is switched with the vehicle 10b at time=4t. As an exception, the vehicle 10f is introduced into the circulation route at time=2t and is switched with the vehicle 10c at time=8t.

Consequently, according to the operation schedule, the number of vehicles 10 traveling on the circulation route is maintained at the specified number (in this case, a=3) from time=2t onwards. From time=2t onwards, "a" vehicles 10 traveling on the circulation route are arranged at substantially equal intervals on the circulation route. The above-described normal switching occurs once in each specified period P (here, P=4t) from time=4t onwards. Note that during a certain time period (here, the period from time=0 to time=8t) from the operation start time of the transportation service, a plurality of vehicles 10 are on the same lap simultaneously on an exceptional basis. For example, the vehicles 10a and 10f, which are on the circulation route at time=5t, are both on their second lap. However, in order for the cycle in which the normal switching occurs to be maintained as the specified period P (here, P=4t), the vehicles 10e and 10f that are exceptionally introduced during the certain time period are switched with the vehicles 10b and 10c, respectively, before completing the specified number of laps n (here, n=4 laps).

In the present embodiment, each vehicle 10 travels automatically to follow the operation schedule. Specifically, each vehicle 10 has a set upper speed limit allowed in advance. When a vehicle 10 traveling on the circulation route is delayed relative to the operation schedule, for example, the vehicle 10 can accelerate, to an extent that the vehicle speed does not exceed the upper speed limit, in order to reduce or eliminate the delay.

A case is now considered in which a first vehicle 10 stopped at a bus stop, for example, experiences a relatively long delay, and a second vehicle 10 operating according to the operation schedule passes the first vehicle 10. In such a case, the first vehicle 10 might subsequently pass the second vehicle 10 by accelerating to reduce or eliminate the delay after departing the bus stop. However, the processing load and difficulty of automatic driving control when passing are higher than for automatic driving control during normal travel. Therefore, an increase in the number of times vehicles 10 pass each other may be undesirable from a safety perspective.

In contrast, the server 20 according to the present embodiment judges whether the first vehicle 10 is delayed relative to the operation schedule. When the server 20 judges that the first vehicle 10 is delayed relative to the operation schedule, the server 20 judges whether passing of the first vehicle 10 by the second vehicle 10 has occurred (i.e., whether the second vehicle 10 has passed the first vehicle 10). When the server 20 judges that passing by the second vehicle 10 has occurred, the server 20 then sets a limit on the vehicle speed of the first vehicle 10.

According to this configuration, even if the first vehicle 10 is passed by the second vehicle 10 and accelerates to reduce or eliminate the delay, the likelihood of the first vehicle 10 subsequently passing the second vehicle 10 is reduced. Accordingly, technology for controlling a plurality of vehicles 10 traveling automatically is improved in that the number of times vehicles 10 pass each other is reduced, thereby increasing safety.

Next, configurations of the system 1 will be described in detail.

(Configuration of Vehicle)

Figure 4:
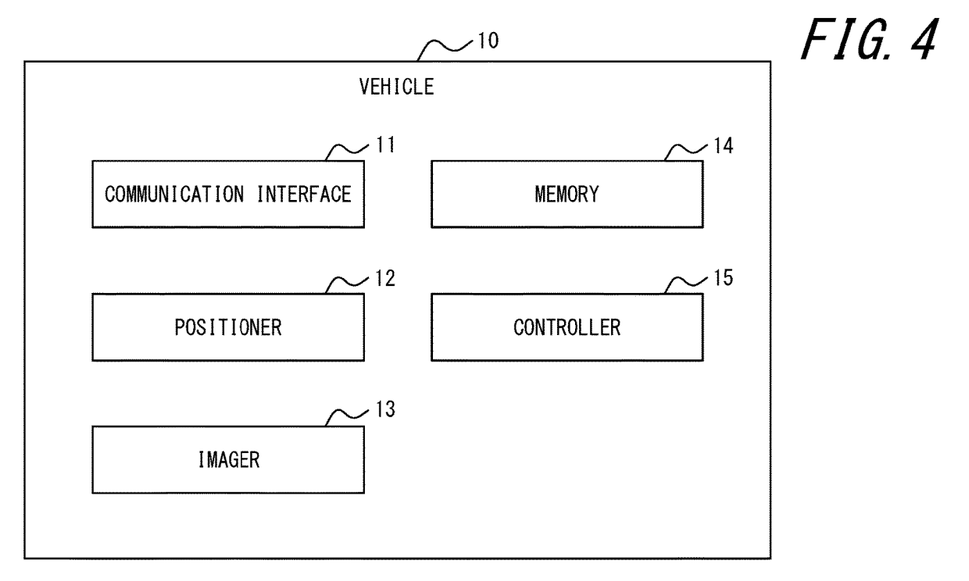
FIG. 4 is a block diagram illustrating a schematic configuration of a vehicle.

As illustrated in FIG. 4, the vehicle 10 includes a communication interface 11, a positioner 12, an imager 13, a memory 14, and a controller 15.

The communication interface 11 includes at least one communication interface for connecting to the network 30. The communication interface is compliant with mobile communication standards such as the 4th generation (4G) standard or the 5th generation (5G) standard, for example, but these examples are not limiting. In the present embodiment, the vehicle 10 communicates with the server 20 via the communication interface 11 and the network 30.

The positioner 12 includes one or more apparatuses configured to acquire positional information for the vehicle 10. Specifically, the positioner 12 includes, for example, a receiver compliant with GPS, but is not limited to this example and may include a receiver compliant with any appropriate satellite positioning system.

The imager 13 includes one or more cameras. Each camera included in the imager 13 may be installed in the vehicle 10 so as to be able to capture a subject outside or inside the vehicle, for example. The images generated by the imager 13 can, for example, be used for automatic driving control of the vehicle 10.

The memory 14 includes one or more memories. The memories are semiconductor memories, magnetic memories, optical memories, or the like, for example, but are not limited to these. The memories included in the memory 14 may each function as, for example, a main memory, an auxiliary memory, or a cache memory. The memory 14 stores any information used for operations of the vehicle 10. For example, the memory 14 may store a system program, an application program, embedded software, and the like. The information stored in the memory 14 may be updated with, for example, information acquired from the network 30 via the communication interface 11.

The controller 15 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 15 controls the operations of the entire vehicle 10. For example, the controller 15 controls the operations of the vehicle 10 according to the operation schedule notified by the server 20.

(Configuration of Server)

Figure 5:
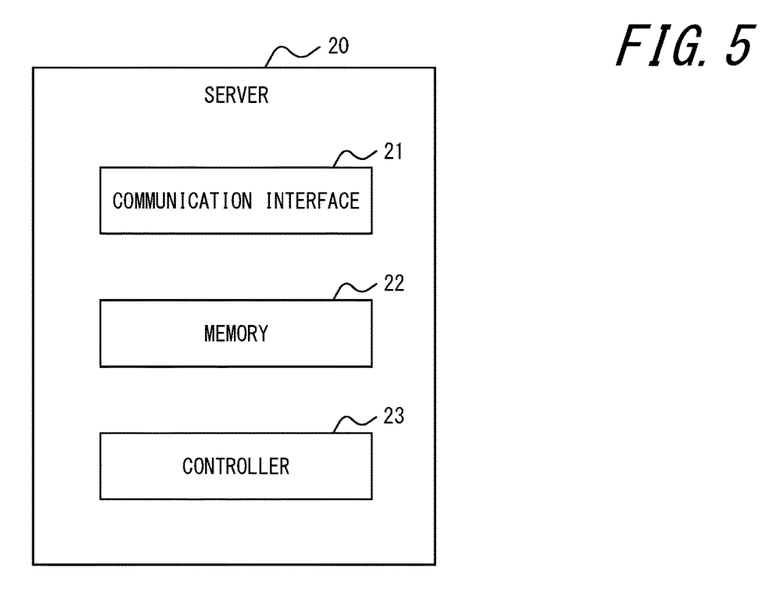
FIG. 5 is a block diagram illustrating a schematic configuration of a server.

As illustrated in FIG. 5, the server 20 includes a communication interface 21, a memory 22, and a controller 23.

The communication interface 21 includes at least one communication interface for connecting to the network 30. The communication interface may be compliant with, for example, mobile communication standards, wired local area network (LAN) standards, or wireless LAN standards, but these examples are not limiting. The communication interface may be compliant with any appropriate communication standards. In the present embodiment, the server 20 communicates with the vehicle 10 via the communication interface 21.

The memory 22 includes one or more memories. The memories included in the memory 22 may each function as, for example, a main memory, an auxiliary memory, or a cache memory. The memory 22 stores any information used for operations of the server 20. For example, the memory 22 may store a system program, an application program, a database, map information, the operation schedule of the plurality of vehicles 10, and the like. The information stored in the memory 22 may be updated with, for example, information acquired from the network 30 via the communication interface 21.

The controller 23 includes at least one processor, at least one programmable circuit, at least one dedicated circuit, or a combination of these. The controller 23 controls the operations of the entire server 20. Details of the operations of the server 20 controlled by the controller 23 will be described later.

(Server Operation Flow)

Figure 6:
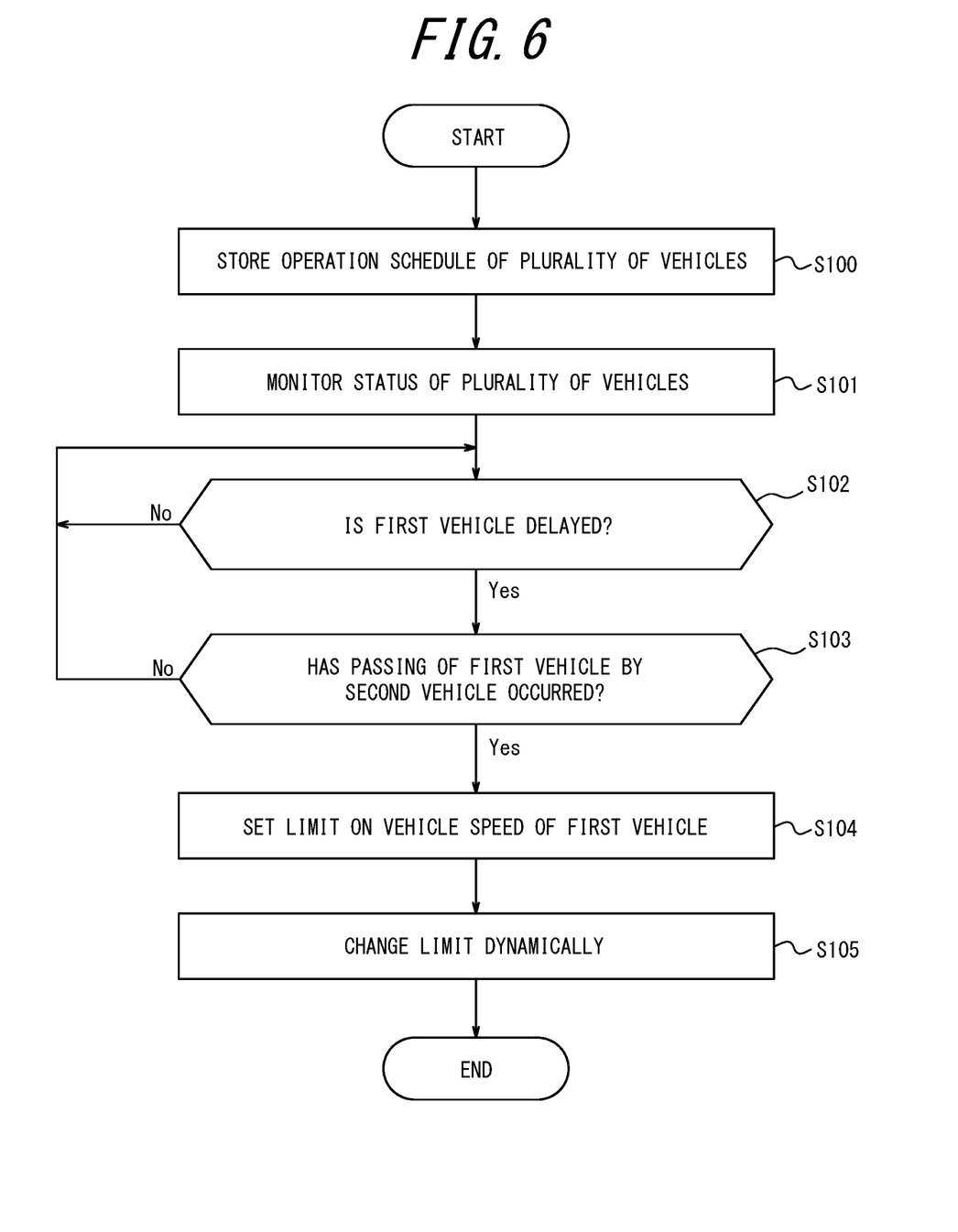
FIG. 6 is a flowchart illustrating operations of the server.

With reference to FIG. 6, operations of the server 20 according to the present embodiment will be described.

Step S100: The controller 23 of the server 20 stores the operation schedule of the plurality of vehicles 10 in the memory 22. The operation schedule may, for example, be generated automatically by the controller 23, inputted by an operator, or acquired from an external apparatus via the communication interface 21 and the network 30.

Details are now provided in accordance with the example illustrated in FIG. 3. As described above, the operation schedule stored in step S100 is determined so that the number of vehicles 10 traveling on the circulation route is maintained at a specified number of vehicles a (here, a=3), except for a certain time period (here, the period from time=0 to time=2t) from the operation start time of the transportation service that uses the plurality of vehicles 10. The operation schedule is determined so that "a" vehicles 10 traveling on the circulation route are arranged at substantially equal intervals on the circulation route, except for a certain time period (in this case, the period from time=0 to time=2t) from the operation start time. The operation schedule is also determined so that a plurality of vehicles 10 are not on the same lap simultaneously, except for a certain time period (in this case, the period from time=0 to time=8t) from the operation start time. Furthermore, the operation schedule is determined so that the switching between a vehicle 10 that has completed the specified number of laps n (here, n=4 laps) and another vehicle 10 occurs once in a specified period P (here, P=4t).

Step S101: The controller 23 starts monitoring the status of the plurality of vehicles 10.

Specifically, the controller 23 is communicably connected to each vehicle 10 via the communication interface 21 and the network 30. The controller 23 notifies the plurality of vehicles 10 of the operation schedule of step S100. Each vehicle 10 operates in accordance with the operation schedule notified by the server 20. The controller 23 then monitors the status of each vehicle 10 by receiving vehicle information from each vehicle 10 periodically or at any appropriate timing, for example. The vehicle information includes positional information for the vehicle 10, but this example is not limiting. The vehicle information may include any appropriate information about the vehicle 10, such as the speed of the vehicle 10, information indicating deviation from the operation schedule (such as delay time), and information indicating that another vehicle 10 has been passed.

Step S102: The controller 23 judges, based on the vehicle information acquired from the plurality of vehicles 10 during the monitoring, whether a first vehicle 10 on the circulation route is delayed relative to the operation schedule. When it is judged that the first vehicle 10 is delayed (step S102: Yes), the process advances to step S103. Conversely, when it is judged that the first vehicle 10 is not delayed (step S102: No), the process repeats step S102.

Step S103: When it is judged in step S102 that the first vehicle 10 is delayed relative to the operation schedule (step S102: Yes), the controller 23 judges whether passing of the first vehicle 10 by a second vehicle 10 on the circulation route has occurred (i.e., whether the second vehicle 10 has passed the first vehicle 10). When it is judged that passing by the second vehicle 10 has occurred (step S103: Yes), the process advances to step S104. Conversely, when it is judged that passing by the second vehicle 10 has not occurred (step S103: No), the process returns to step S102.

If the first vehicle 10 is delayed relative to the operation schedule but is still traveling, the likelihood of being passed by the second vehicle 10 that is following behind is relatively low. Therefore, if the first vehicle 10 is delayed with respect to the operation schedule but is still traveling, steps S102 and S103 end up being repeatedly performed, which may unnecessarily increase the processing load on the controller 23.

In contrast, in the present embodiment, the above-described judgment in step S102 may be performed when the first vehicle 10 is stopped at a bus stop, for example. Specifically, in step S102, the controller 23 judges whether the first vehicle 10 is delayed relative to the operation schedule when the first vehicle 10 is stopped. On the other hand, if the first vehicle 10 is not stopped, the controller 23 reserves the judgment of whether the first vehicle 10 is delayed. According to this configuration, when the first vehicle 10 is delayed with respect to the operation schedule but is still traveling, the likelihood of steps S102 and S103 being repeatedly performed is reduced, thereby reducing the likelihood of an unnecessary increase in the processing load on the controller 23.

Step S104: when it is judged in step S103 that passing by the second vehicle 10 has occurred (step S103: Yes), the controller 23 sets a limit on the vehicle speed of the first vehicle 10.

Specifically, the controller 23 sets a limit on the vehicle speed of the first vehicle 10 by notifying the first vehicle 10 of the limit via the communication interface 21 and the network 30. The limit is less than the upper speed limit allowed in advance for the first vehicle 10. The first vehicle 10 travels automatically to an extent that the vehicle speed does not exceed the notified limit.

Here, the setting of the limit in step S104 may be performed when the distance between the first vehicle 10 and the second vehicle 10 is less than a predetermined value. Specifically, the controller 23 calculates the distance between the vehicles based on, for example, positional information for the first vehicle 10 and the second vehicle 10. The controller 23 sets a limit on the vehicle speed of the first vehicle 10 when the calculated distance between the vehicles is less than a predetermined value. According to this configuration, the delay of the first vehicle 10 can be partially eliminated while reducing the likelihood of the second vehicle 10 being passed by the first vehicle 10.

Step S105: The controller 23 dynamically changes the limit of the vehicle speed of the first vehicle 10 based on the vehicle speed of the second vehicle 10 after the passing of the first vehicle 10 by the second vehicle 10 has occurred.

In greater detail, the controller 23 dynamically changes the limit of the vehicle speed of the first vehicle 10 so as not to exceed the vehicle speed of the second vehicle 10 when the vehicle speed of the second vehicle 10 is equal to or greater than a reference value after the passing by the second vehicle 10 has occurred. The reference value is less than the upper speed limit allowed in advance for the second vehicle 10. According to this configuration, the vehicle speed of the first vehicle 10 does not exceed the vehicle speed of the second vehicle 10, except for when the vehicle speed of the second vehicle 10 is less than the reference value (for example, when the second vehicle 10 is stopped or is traveling slowly). The delay of the first vehicle 10 can thereby be partially eliminated while reducing the likelihood of the second vehicle 10 being passed by the first vehicle 10.

The aforementioned operations pertaining to step S105 are continuously performed until, for example, the first vehicle 10 returns to the base from the circulation route.

As described above, the server 20 according to the present embodiment judges whether the first vehicle 10 is delayed relative to the operation schedule. When the server 20 judges that the first vehicle 10 is delayed relative to the operation schedule, the server 20 judges whether passing of the first vehicle 10 by the second vehicle 10 has occurred. When the server 20 judges that passing by the second vehicle 10 has occurred, the server 20 then sets a limit on the vehicle speed of the first vehicle 10.

According to this configuration, even if the first vehicle 10 is passed by the second vehicle 10 and accelerates to reduce or eliminate the delay, the likelihood of the first vehicle 10 subsequently passing the second vehicle 10 is reduced. Accordingly, technology for controlling a plurality of vehicles 10 traveling automatically is improved in that the number of times vehicles 10 pass each other is reduced, thereby increasing safety.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the server 20 in the above embodiment are distributed to a plurality of information processing apparatuses capable of communicating with each other can also be implemented. For example, an embodiment in which some or all of the components of the server 20 are provided in the vehicle 10 can also be implemented.

For example, an embodiment in which a general purpose computer functions as the server 20 according to the above embodiment can also be implemented. Specifically, a program in which processes for realizing the functions of the server 20 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. A control method for controlling a plurality of vehicles automatically traveling to follow an operation schedule, the control method comprising:
receiving, by a server, data transmitted from a first vehicle;
judging, by the server, whether the first vehicle is delayed relative to the operation schedule based on the data received from the first vehicle;
upon judging that the first vehicle is delayed relative to the operation schedule, judging, by the server, whether passing of the first vehicle by a second vehicle following the operation schedule has occurred;
upon judging that the passing has occurred, setting, by the server, a limit on a vehicle speed of the first vehicle; and
transmitting, by the server to the first vehicle, the limit so that the first vehicle automatically travels to complete a route of the operation schedule with the vehicle speed that does not exceed the limit.

2. The control method of claim 1, wherein the server judges whether the first vehicle is delayed relative to the operation schedule when the first vehicle is stopped.

3. The control method of claim 1, wherein the server sets the limit on the vehicle speed of the first vehicle when a distance between the first vehicle and the second vehicle is less than a predetermined value.

4. The control method of claim 1, wherein the limit is less than an upper speed limit allowed in advance for the first vehicle.

5. The control method of claim 1, further comprising dynamically changing, by the server, the limit based on a vehicle speed of the second vehicle after the passing occurs.

6. The control method of claim 5, wherein the limit is dynamically changed so as not to exceed the vehicle speed of the second vehicle when the vehicle speed of the second vehicle is equal to or greater than a reference value after the passing occurs.

7. A server comprising a communication interface configured to communicate with a plurality of vehicles automatically traveling to follow an operation schedule and a controller configured to:
receive data transmitted from a first vehicle;
judge whether the first vehicle is delayed relative to the operation schedule based on the data received from the first vehicle;
upon judging that the first vehicle is delayed relative to the operation schedule, judge whether passing of the first vehicle by a second vehicle following the operation schedule has occurred;
upon judging that the passing has occurred, set a limit on a vehicle speed of the first vehicle; and
transmit the limit to the first vehicle so that the first vehicle automatically travels to complete a route of the operation schedule with the vehicle speed that does not exceed the limit.

8. The server of claim 7, wherein the controller is configured to judge whether the first vehicle is delayed relative to the operation schedule when the first vehicle is stopped.

9. The server of claim 7, wherein the controller is configured to set the limit on the vehicle speed of the first vehicle when a distance between the first vehicle and the second vehicle is less than a predetermined value.

10. The server of claim 7, wherein the limit is less than an upper speed limit allowed in advance for the first vehicle.

11. The server of claim 7, wherein the controller is configured to change the limit dynamically based on a vehicle speed of the second vehicle after the passing occurs.

12. The server of claim 11, wherein the controller is configured to change the limit dynamically so as not to exceed the vehicle speed of the second vehicle when the vehicle speed of the second vehicle is equal to or greater than a reference value after the passing occurs.

13. A system comprising a plurality of vehicles automatically traveling to follow an operation schedule and a server configured to communicate with the plurality of vehicles, wherein the server is configured to:
receive data transmitted from a first vehicle;
judge whether the first vehicle is delayed relative to the operation schedule based on the data received from the first vehicle;
upon judging that the first vehicle is delayed relative to the operation schedule, judge whether passing of the first vehicle by a second vehicle following the operation schedule has occurred;
upon judging that the passing has occurred, set a limit on a vehicle speed of the first vehicle; and
transmit the limit to the first vehicle so that the first vehicle automatically travels to complete a route of the operation schedule with the vehicle speed that does not exceed the limit.

14. The system of claim 13, wherein the server is configured to judge whether the first vehicle is delayed relative to the operation schedule when the first vehicle is stopped.

15. The system of claim 13, wherein the server is configured to set the limit on the vehicle speed of the first vehicle when a distance between the first vehicle and the second vehicle is less than a predetermined value.

16. The system of claim 13, wherein the limit is less than an upper speed limit allowed in advance for the first vehicle.

17. The system of claim 13, wherein the server is configured to change the limit dynamically based on a vehicle speed of the second vehicle after the passing occurs.

18. The system of claim 17, wherein the server is configured to change the limit dynamically so as not to exceed the vehicle speed of the second vehicle when the vehicle speed of the second vehicle is equal to or greater than a reference value after the passing occurs.

* * * * *